United States Patent
Kim et al.

(10) Patent No.: US 8,374,141 B2
(45) Date of Patent: Feb. 12, 2013

(54) METHOD AND APPARATUS FOR ALLOCATING CHANNEL BANDWIDTH IN WIRELESS INTERNET PROTOCOL TELEVISION SYSTEMS

(75) Inventors: Jun Hyung Kim, Suwon-si (KR); Sung Oh Hwang, Yongin-si (KR); Joon Hwang Kim, Seoul (KR); Kyung Tae Kim, Suwon-si (KR); Hee Yong Youn, Seongnam-si (KR); Hyun Chul Lee, Geoje-si (KR)

(73) Assignees: Samsung Electronics Co., Ltd (KR); Sungkyunkwan University Foundation for Corporate Collaboration (KR)

( * ) Notice: Subject to any disclaimer, the term of this patent is extended or adjusted under 35 U.S.C. 154(b) by 348 days.

(21) Appl. No.: 12/722,131

(22) Filed: Mar. 11, 2010

(65) Prior Publication Data

US 2010/0232383 A1    Sep. 16, 2010

(30) Foreign Application Priority Data

Mar. 11, 2009    (KR) ........................ 10-2009-0020742

(51) Int. Cl.
*H04N 7/173* (2011.01)
*H04W 4/00* (2009.01)
*H04W 72/04* (2009.01)
*H04B 1/66* (2006.01)

(52) U.S. Cl. ................... 370/329; 370/477; 375/240.01; 455/3.01; 455/450; 725/87; 725/95; 725/118

(58) Field of Classification Search .................. 370/329, 370/477; 375/240.01; 455/3.01, 450; 725/87, 725/95, 118

See application file for complete search history.

(56) References Cited

U.S. PATENT DOCUMENTS

| | | | | |
|---|---|---|---|---|
| 6,211,901 | B1 * | 4/2001 | Imajima et al. | 725/93 |
| 7,451,475 | B1 * | 11/2008 | Oz et al. | 725/127 |
| 7,624,153 | B2 * | 11/2009 | Thukral | 709/206 |
| 7,669,220 | B2 * | 2/2010 | Goode | 725/95 |
| 7,761,902 | B2 * | 7/2010 | Liu et al. | 725/95 |
| 7,886,056 | B2 * | 2/2011 | Collet et al. | 709/226 |
| 7,970,932 | B2 * | 6/2011 | Liu et al. | 709/239 |
| 2005/0041679 | A1 * | 2/2005 | Weinstein et al. | 370/432 |
| 2005/0289618 | A1 * | 12/2005 | Hardin | 725/95 |
| 2006/0067362 | A1 * | 3/2006 | Ramakrishnan | 370/468 |
| 2008/0051026 | A1 * | 2/2008 | Kim et al. | 455/3.01 |

(Continued)

FOREIGN PATENT DOCUMENTS

| KR | 1020020062291 | 7/2002 |
|---|---|---|
| KR | 100780396 | 11/2007 |

(Continued)

*Primary Examiner* — Alpus H Hsu
(74) *Attorney, Agent, or Firm* — The Farrell Law Firm, P.C.

(57) ABSTRACT

A method and apparatus for allocating channel bandwidths in a wireless IPTV system is provided. The method includes measuring, if an additional service offering request is received in a saturation channel state, remaining execution times until a service of each terminal that is currently receiving a service is terminated, and setting a minimum of the measured remaining execution times to a unit time; calculating a securable channel bandwidth per the unit time with respect to each terminal that is currently receiving a service; and allocating, if the summation of the securable channel bandwidths per the unit time is equal to or greater than a channel bandwidth required to provide the additional service, the requested channel bandwidth in order to provide the additional service.

12 Claims, 6 Drawing Sheets

U.S. PATENT DOCUMENTS

| | | |
|---|---|---|
| 2008/0101460 A1 | 5/2008 | Rodriguez |
| 2008/0192820 A1* | 8/2008 | Brooks et al. ............ 375/240.02 |
| 2009/0025027 A1 | 1/2009 | Craner |
| 2009/0285106 A1* | 11/2009 | Bernard et al. ................ 370/242 |
| 2009/0313667 A1* | 12/2009 | Zhao et al. ....................... 725/93 |
| 2010/0085906 A1* | 4/2010 | Yamamoto ................... 370/312 |
| 2010/0172367 A1* | 7/2010 | Foti ................................ 370/431 |
| 2011/0099595 A1* | 4/2011 | Lindquist et al. ............. 725/105 |

FOREIGN PATENT DOCUMENTS

| | | |
|---|---|---|
| WO | WO 01/31605 | 5/2001 |
| WO | WO 2008/156260 | 12/2008 |

\* cited by examiner

METHOD AND APPARATUS FOR ALLOCATING CHANNEL BANDWIDTH IN WIRELESS INTERNET PROTOCOL TELEVISION SYSTEMS

PRIORITY

This application claims priority to an application filed with the Korean Intellectual Property Office on Mar. 11, 2009 and assigned Serial No. 10-2009-0020742, the content of which is incorporated herein by reference.

BACKGROUND OF THE INVENTION

1. Field of the Invention

The present invention relates generally to wireless Internet protocol TeleVision (IPTV) systems, and more particularly, to a method and apparatus that can efficiently manage bandwidths to preserve channels for additional users in a Video on Demand (VoD) service of a wireless IPTV system.

2. Description of the Related Art

Internet Protocol TeleVision (IPTV) systems provide multimedia services via IP networks that guarantee the quality, security and reliability of the multimedia services. The multimedia services include television, video, audio, document, graphic, data services, etc. IPTV services may also be classified into real-time broadcast services and Video on Demand (VoD) services.

Unlike the real-time broadcast services, which are deployed through broadcast methods, VoD services are deployed through unicast methods, so that a maximum number of available users is identical to the number of available channels. As the market of the wireless IPTV systems gradually increases, IPTV services will be provided to a large number of users. Therefore, it is expected that current bandwidths cannot properly cover operations to an increased number of users. Therefore, a method is required to efficiently manage the limited bandwidth and provide additional services to users.

The conventional traffic control technology used in IPTV systems can detect states of an IPTV system at any time as well as variably control the bandwidth and the amount of data transmission, by receiving a feedback of the amount of data buffered in a terminal and continuing to monitor the network. Although the conventional traffic control technology efficiently uses the existing bandwidth, the conventional technology is disadvantageous in that it cannot provide services to terminals beyond the maximum number of available channels. Therefore, while all users are using bandwidths allocated to a VoD service within the limited bandwidth, if additional users request the service, a method is required to provide the service to these additional users.

SUMMARY OF THE INVENTION

The present invention has been made in view of the above problems, and provides a method and apparatus that can allocate channel bandwidths to overcome limitations regarding the restricted number of users that can use a VoD service in a wireless IPTV system.

The present invention further provides a method and apparatus that can allocate channel bandwidths to secure channels for additional users while all bandwidths for a VoD service are being used, thereby providing the VoD service to a greater number of users than the number of users who could previously use the service according to conventional methods.

In accordance with an embodiment of the present invention, the present invention provides a method for allocating channel bandwidths in a wireless IPTV system, the method including measuring, if an additional service offering request is received in a saturation channel state, remaining execution times until a service of each terminal that is currently receiving a service is terminated, and setting a minimum of the measured remaining execution times to a unit time; calculating a securable channel bandwidth per the unit time with respect to each terminal that is currently receiving a service; and allocating, if a summation of the securable channel bandwidths per the unit time is greater than or equal to a channel bandwidth required to provide the additional service, the requested channel bandwidth in order to provide the additional service.

In accordance with another embodiment of the present invention, the present invention provides an apparatus for providing a wireless IPTV service, including a channel bandwidth calculating unit and a channel bandwidth allocating unit. The channel bandwidth calculating unit measures, if an additional service offering request is received in a saturation channel state, remaining execution times until a service of each terminal that is currently receiving a service is terminated, and sets a minimum of the measured remaining execution times to a unit time. It also calculates a securable channel bandwidth per the unit time with respect to each terminal that is currently receiving a service. The channel bandwidth allocating unit allocates, if a summation of the securable channel bandwidths per the unit time is greater than or equal to a channel bandwidth required to provide the additional service, the requested channel bandwidth in order to provide the additional service.

BRIEF DESCRIPTION OF THE DRAWINGS

The features and advantages of certain embodiments of the present invention will become more apparent from the following detailed description in conjunction with the accompanying drawings, in which.

DETAILED DESCRIPTION OF EMBODIMENTS

Hereinafter, various embodiments of the present invention are described in detail with reference to the accompanying drawings. The same reference numbers are used throughout the drawings to refer to the same or similar parts. Detailed descriptions of well-known functions and structures incorporated herein may be omitted to avoid obscuring the subject matter of the present invention.

Figure 1:
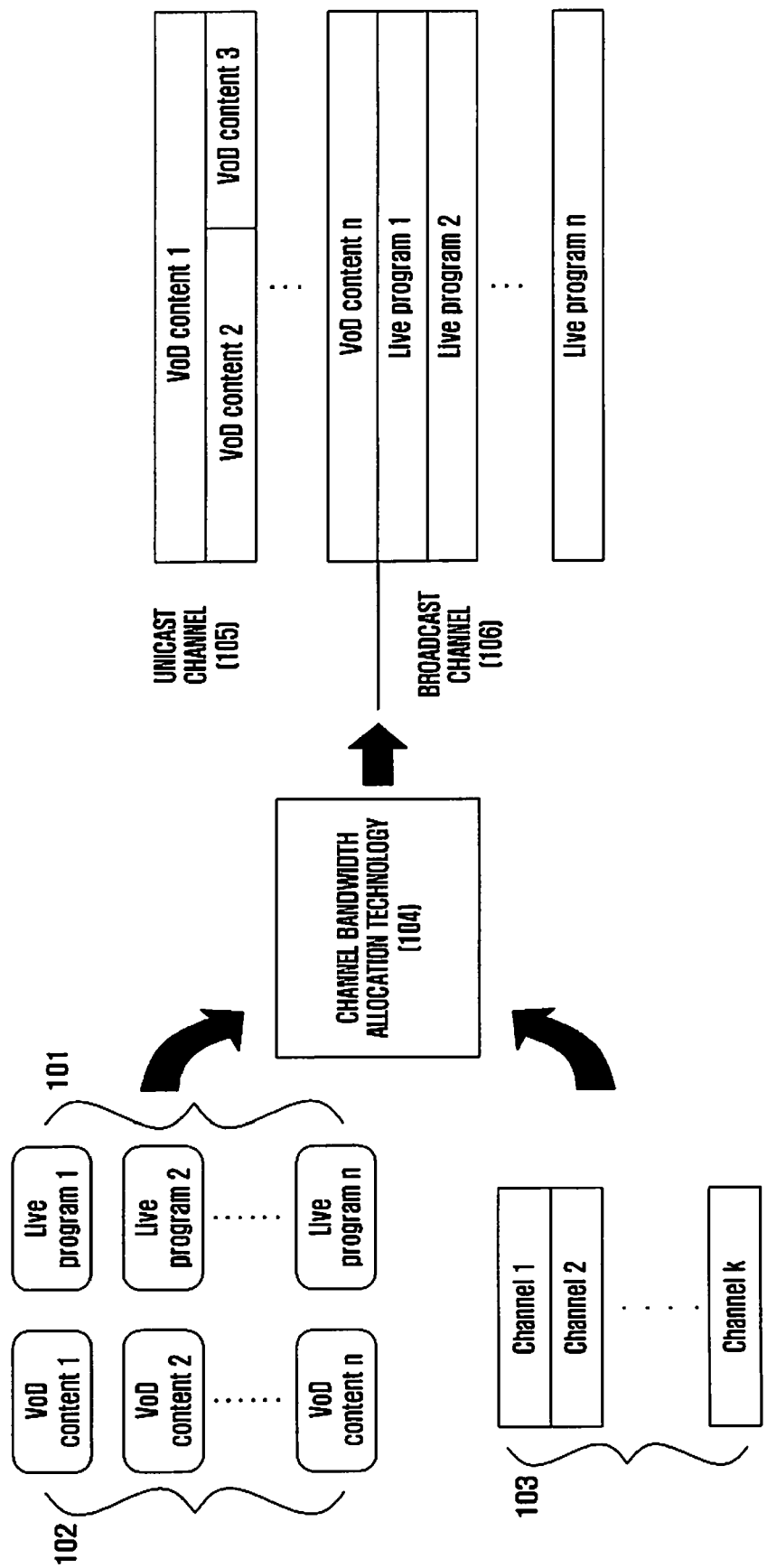
FIG. 1 is a diagram illustrating a channel allocation structure in a wireless IPTV system.

FIG. 1 is a diagram illustrating a channel allocation structure in a wireless IPTV system.

Referring to FIG. 1, contents provided by the wireless IPTV system, are divided into real-time broadcast content 101 and VoD content 102. The real-time broadcast content 101 and the VoD content 102 are allocated to different bandwidths of channels 103 that can be used by the wireless IPTV system. For example, in FIG. 1, the real-time broadcast content 101 is allocated to a broadcast channel 106 with a certain bandwidth and the VoD content 102 is allocated to a unicast channel 105 with bandwidths that differ according to the users who request contents. In order to efficiently transmit the VoD content 102, a technology for allocating a variety of channel bandwidths is proposed to efficiently manage the limited bandwidth of the unicast channel 105.

The channel bandwidth allocation technology unit 104 allocates available channels to users, in consideration of the entire state of the IPTV system, which may include the number of users accessing the system, system resources, service quality, etc. Unlike wired IPTV systems, a wireless IPTV system based on a wireless network must efficiently use limited bandwidth. Therefore, wireless IPTV systems preferably require the channel bandwidth allocation technology 104.

Figure 2:
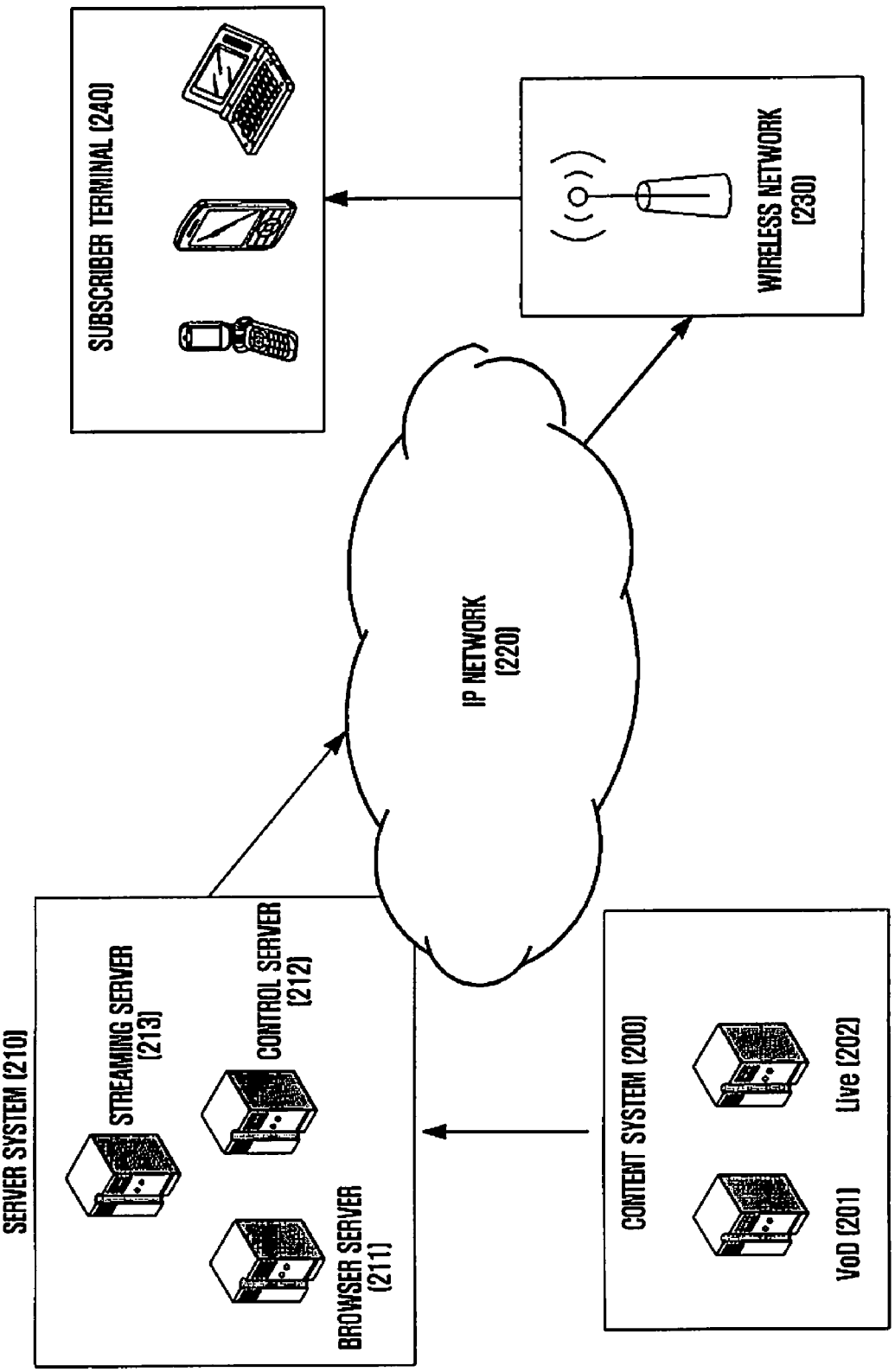
FIG. 2 is a diagram illustrating a configuration of a wireless IPTV system.

FIG. 2 is a diagram illustrating a configuration of a wireless IPTV system.

Referring to FIG. 2, the wireless IPTV system includes a content system 200, a server system 210, an IP network 220, a wireless network 230, and subscriber terminals 240.

The content system 200 stores and manages the VoD content 201 and the real-time broadcast content 202, which are provided wireless IPTV system, separately. The content system 200 performs the conversion of data format (Moving Picture Experts' Group (MPEG)-2, H.264/Scalable Video Coding (SVC), etc.), which can be played back by the subscriber terminals 240, and then transmits the converted data to the server system 210.

The server system 210 controls the VoD content 201 and real-time broadcast content 202, transmitted from the content system 200, and transmits the VoD content 201 and the real-time broadcast content 202 to the subscriber terminals 240.

The server system 210 includes a browser server 211, a control server 212, and a streaming server 213. The browser server 211 provides an entire interface through which the subscriber terminals 240 can select contents from a list of contents. The control server 212 manages server states, and performs log analysis and monitoring operations. In particular, the control server 211 considers the features of the wireless network 230, such as packet loss, frequent error occurrence, delay time, etc. The control server 211 also considers the features of the subscriber terminals 240, such as limited resources, mobility, etc. In order to smoothly play back multimedia in the subscriber terminals 240, the codec should be light, i.e., the codec should not cause too much of a burden on a processor implementing the codec.

The streaming server 213 transmits contents selected by the subscriber terminals 240. In particular, the streaming server 213 considers issues of scalability, security, and efficiency. The streaming server 213 also requires a proper scheduling scheme in order to guarantee a user's Quality of Service (QoS), and further requires an efficiency scheme that considers the environment of the wireless network 230 and the subscriber terminals 240.

Figure 3:
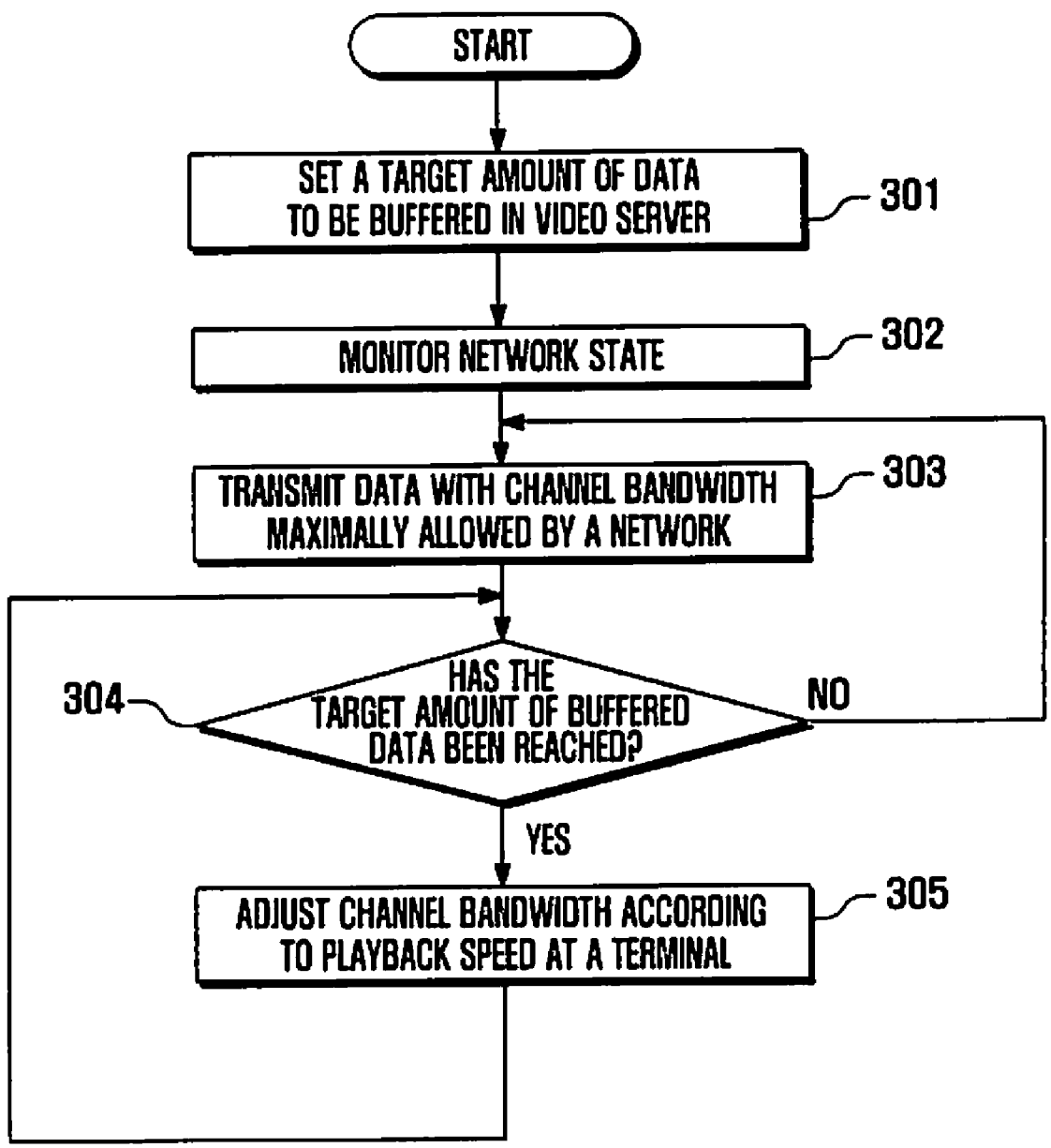
FIG. 3 is a flow chart illustrating a method for controlling general traffic in a wireless IPTV system.

FIG. 3 is a flow chart illustrating a method for controlling general traffic in a wireless IPTV system. The traffic control method is performed by a server system that includes a browser server, a control server, and a streaming server. The traffic control method controls service traffic so that the server system can adjust bandwidths according to current contents stored in a buffer of a subscriber terminal and maintain an amount of data currently being buffered in a subscriber terminal to a target amount of buffered data set by the video server. The traffic control method according to FIG. 3 also supports a stable playback of VoD content in the IPTV systems.

Referring to FIG. 3, the server system sets a target amount of data to be buffered in a subscriber terminal, in step 301. The target amount of data to be buffered in a subscriber terminal refers to a minimum amount of data that the subscriber terminal must secure in order to stably play back contents without discontinuity and delay. The target amount of data to be buffered in a subscriber terminal is not affected by changes in the amount of data transmission from the server system, even when the network state is changed. The server system monitors a network, in step 302, and transmits data, with the maximum bandwidth, according to the network state, to the subscriber terminal, in step 303. The server system identifies the amount of data buffered in the subscriber terminal, in step 304. If the server system determines that the amount of data buffered in the subscriber terminal reaches a target amount of buffered data at 304, the server system controls the traffic by reducing the transmission bandwidth and the transmission according to the playback speed of the content, in step 305. If the server system determines that the amount of data buffered in the subscriber terminal does not reach a target amount of buffered data at 304, the server system returns to step 303. The traffic control method can effectively use the available bandwidth described above. However, the traffic control method according to FIG. 3 is disadvantageous in that the method according to FIG. 3 cannot provide service to terminals over the number of maximum available terminals.

Figure 4:
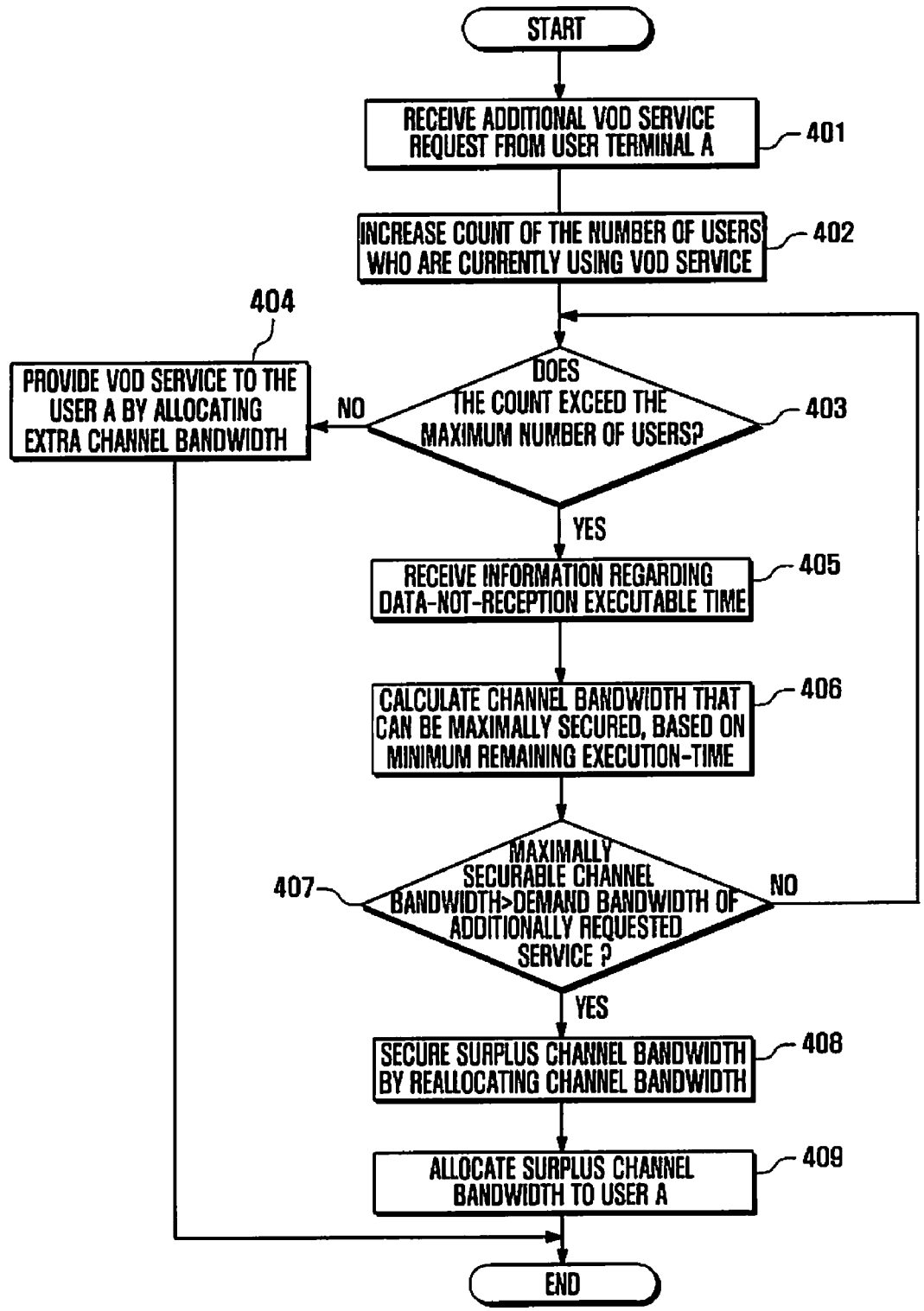
FIG. 4 is a flow chart illustrating a method for allocating channel bandwidths through a VoD service of a wireless IPTV system according to an embodiment of the present invention.

FIG. 4 is a flow chart illustrating a method according to an embodiment of the present invention for dynamically allocating and managing bandwidths allocated to subscribers according to the ratio of resource use (stored data and remaining playback time), and securing bandwidths for additional users, if an wireless IPTV system is in a channel saturation state that exceeds the number of users who can use a VoD service.

Referring to FIG. 4, the channel allocating method for providing a service to a user terminal A that requests an additional service offer includes calculating channel bandwidths that the content server can secure, determining whether to provide a service to the user terminal A, and securing a channel bandwidth for the user terminal A, which has additionally requested a service by dynamically allocating channel bandwidths of user terminals that are currently receiving a VoD service. More specifically, the server receives a VoD service request signal from a user terminal A, in step 401. The server increases a count of the number of users that are currently using a VoD service, in step 402. The server determines whether the count exceeds the maximum available number of users, in step 403.

If the server determines that the count does not exceed the maximum available number of users at 403, the server allocates an extra channel bandwidth to provide the VoD service to the user terminal A, in step 404. In order to receive a large amount of data before the count reaches the maximum available number of users, all of the user terminals receive the VoD service at the maximum receivable speed before the count exceeds the maximum available number of users.

However, if the server determines that the count exceeds the maximum available number of users at 403, i.e., if the server has additionally received a VoD service request in a channel saturation state, the requests information regarding an executable time using only data stored in a buffer of a user terminal from among user terminals that receives a current VoD service, in step 405, where the executable time is referred to as a data-not-reception executable time.

If the server has received information regarding a data-not-reception executable time from all the user terminals that are currently receiving a VoD service, the server measures the remaining execution time until the current VoD service to each user terminal is terminated, sets a minimum remaining execution time to a unit time, and calculates the maximum securable channel bandwidth per unit time, in step 406. A minimum remaining execution time is used as a reference because a user terminal, which does not receive a service after the minimum remaining execution time, must to return its previously allocated channel bandwidth after the unit time. Therefore, if a channel bandwidth for an additional user can only be secured during the unit time, even when the channel is in a saturation state, the server can provide a service to the additional user terminal. Therefore, it is possible to provide an additional service only if a surplus channel bandwidth necessary for an additional user can be secured before the server stops providing a service to one of the user terminals that are currently receiving a VoD service. In order to calculate a securable channel bandwidth per unit time, data-not-reception executable times of user terminals (i.e., executable times using data stored in a buffer) and a minimum request transmission speed required to receive a service (i.e., the lowest transmission speed that can guarantee QoS) are required.

For convenience, one of the user terminals that is currently receiving a VoD service is referred to as user terminal B. If a data-not-reception time of the user terminal B is greater than or equal to the unit time, the channel bandwidth of the user terminal B can be used is as an extra channel bandwidth during the unit time. For example, when a data-not-reception time is greater than a unit time, the channel bandwidth can be acquired by the following Equation (1).

Securable channel bandwidth=transmission speed to user terminal $B$×unit time (1)

If a data-not-reception time of user terminal B is less than the unit time, the channel bandwidth of user terminal B can be acquired by the following Equation (2).

Securable channel bandwidth=(transmission speed to user terminal $B$×data-not-reception executable time)+(transmission speed to user terminal $B$−lowest transmission speed to user terminal $B$)×(unit time−data-not-reception executable time) (2)

(data-not-reception executable time<unit time)

Regarding the user terminals that are currently receiving a VoD service, the maximally securable channel bandwidth can be calculated by the following algorithm.

```
For(i=1;i=n; i++) {
    IF (T_BUF >= T_MINREM)
        Total =+ R_i * T_MINREM
    else
        Total =+ R_i * T_BUF + (R_i - R_MINi) * (T_MINREM - T_BUF)
}
```

In the above algorithm, $R_i$ denotes a current transmission speed to user terminal i, $T_{BUF}$ denotes a data-not-reception executable time of user terminal i, $R_{MINI}$ denotes the lowest transmission speed to user terminal i where a QoS can be guaranteed, and $T_{MINREM}$ denotes a unit time. According to the algorithm, the maximally securable channel bandwidth (Total) can be calculated during the unit time ($T_{MINREM}$) Therefore, the greater the amount of data previously received, the greater the number of users that can additionally receive a service.

Referring to FIG. 4, the server compares the maximally securable channel bandwidth (Total) with a request channel bandwidth for providing a VoD service additionally requested, during the unit time ($T_{MINREM}$), in step 407. If the server determines that the maximally securable channel bandwidth (Total) is greater than a request channel bandwidth for providing a VoD service additionally requested, during the unit time ($T_{MINREM}$) at step 407, the server concludes that the server can provide the service. In that case, the server reduces the channel bandwidth of user terminals that are currently receiving the service and secures a request channel bandwidth for providing an additionally requested VoD service, i.e., a surplus channel bandwidth, in step 408. Reduction of the channel bandwidth of user terminals that are currently receiving the service is performed by sorting the amount of stored data by the priority sequence, and then reducing the channel bandwidth from the user terminal that has the largest amount of data. After the reduction is performed in step 408, the server allocates the surplus channel bandwidth to a user terminal that request a VoD service in step 409.

However, if the server determines that the maximally securable channel bandwidth (Total) is less than a request channel bandwidth for providing a VoD service additionally requested during the unit time ($T_{MINREM}$) at step 407, the server concludes that the server cannot provide the service. In that case, the service provided to one of the user terminals currently using the service is terminated so that an additional service can be provided, but the available channel bandwidth is secured so that the server waits until the maximally securable channel bandwidth is greater than a request channel bandwidth. The server can check the count of the number of users according to a preset time period and calculate the maximally securable channel bandwidth. The preset time period can be set according to the performance of the system.

Figure 5:
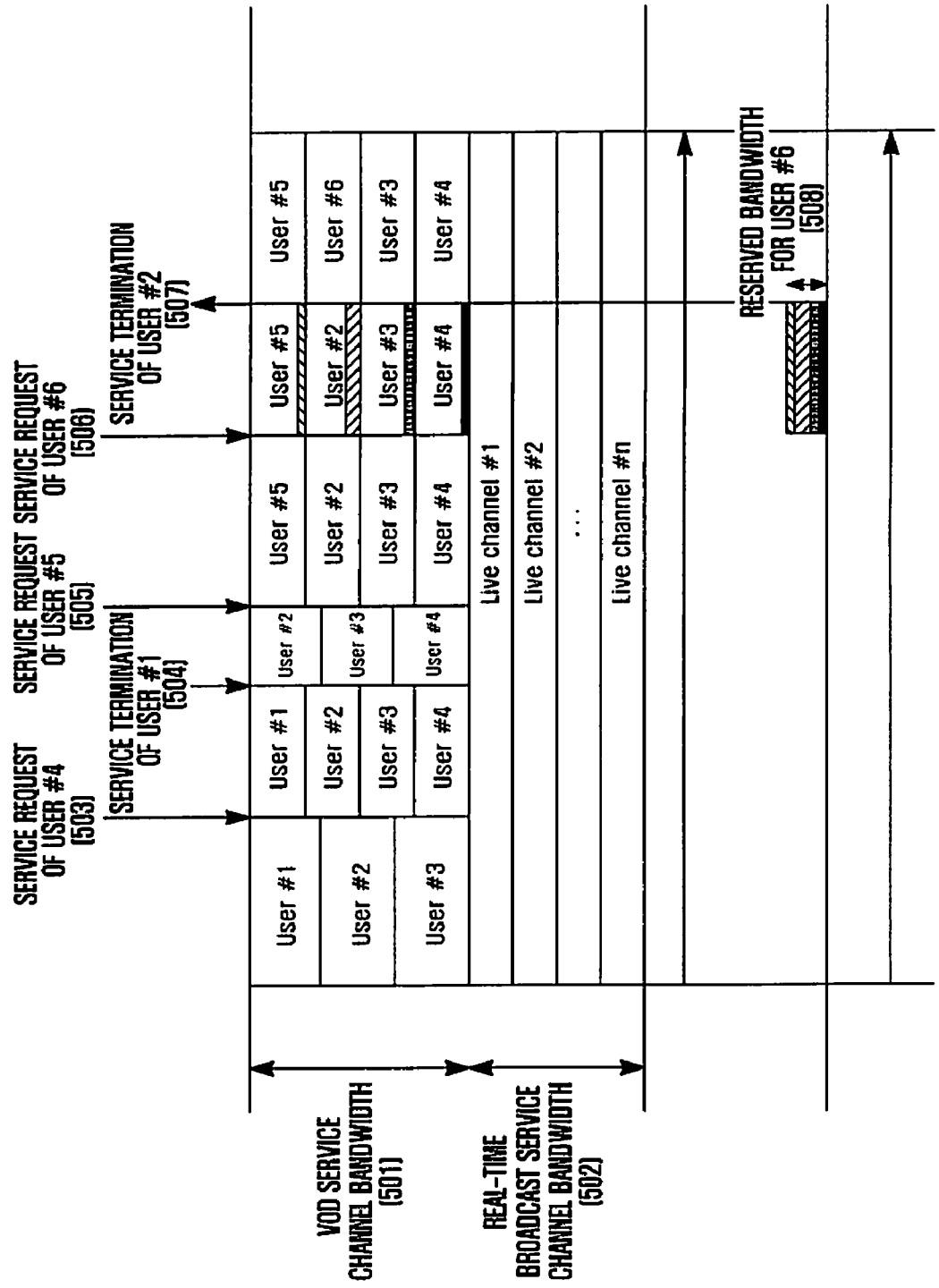
FIG. 5 is a flow diagram illustrating a process of allocating channel bandwidths to users' terminals that have requested a VoD service in a method for allocating channel bandwidths according to an embodiment of the present invention.

FIG. 5 is a flow diagram illustrating a process of allocating channel bandwidths to users' terminals that requested a VoD service in a method for allocating channel bandwidths, according to an embodiment of the present invention.

Referring to FIG. 5, a certain bandwidth per channel is allocated to broadcast transmission channels 502 in order to provide a real-time broadcast service. Likewise, a certain bandwidth per channel is allocated to unicast transmission channel bandwidths 501 according to users that request contents, with respect to a VoD service. For convenience, it is assumed that the maximum number of available users of the VoD service channel 501 is four, as an example. However, other maximum numbers may be used in accordance with the present invention. While users 1 to 3 are receiving a service, if user 4 requests a service at step 503, the server allocates an extra channel bandwidth to user 4. After that, if the service of the user 1 is terminated at step 504, the server controls traffic to secure the maximum channel bandwidth with respect to users 2 to 4.

If user 5 requests a service at step 505, since the maximum number of available users has not been exceeded, the server allocates an extra channel bandwidth to the user 5. After that the allocation in step 505, if user 6 requests a service in step 506, since the maximum number of available users has been exceeded, the server calculates the maximally securable channel bandwidth using the bandwidth allocating method according to the present invention, reduces the channel bandwidths of users that were receiving a service, secures a surplus channel bandwidth, i.e., a request channel bandwidth for providing an additionally request VoD service, and allocates the surplus channel bandwidth to the user 6. Reduction of the channel bandwidth of user terminals that were receiving the service is performed by sorting the amount of stored data by the priority sequence, and then reducing the channel bandwidth from the user terminal that has the largest amount of data. After the reduction is performed in step 506, if the service of user 2 is terminated in step 507, the server controls traffic to secure the maximum channel bandwidth with respect to users 3 to 6.

Figure 6:
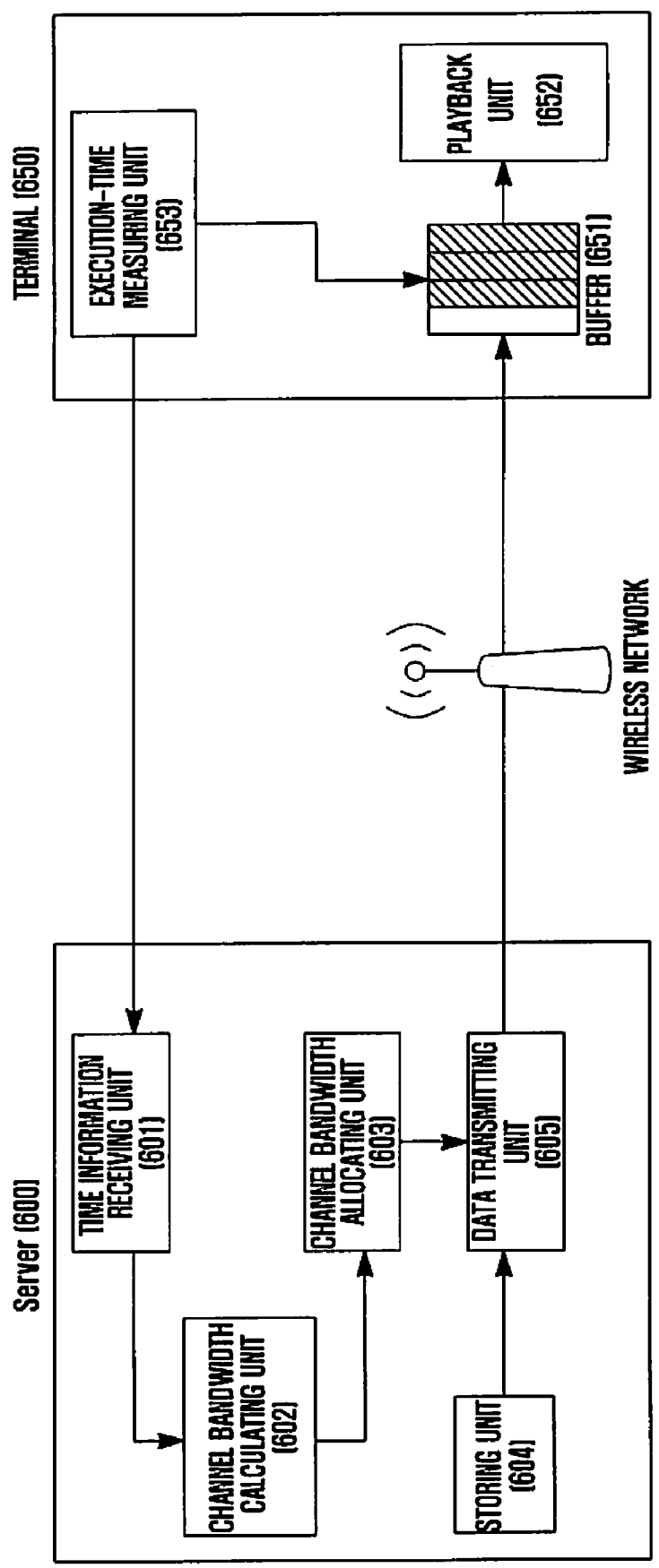
FIG. 6 is a schematic block diagram illustrating a wireless IPTV system according to an embodiment of the present invention.

FIG. 6 is a schematic block diagram illustrating a wireless IPTV system according to an embodiment of the present invention.

Referring to FIG. 6, the wireless IPTV system includes a server 600 and a terminal 650.

The server 600 includes a time information receiving unit 601, a channel bandwidth calculating unit 602, a channel bandwidth allocating unit 603, a storing unit 604, and a data transmitting unit 605. If the time information receiving unit 601 receives a number of requests that is greater than the maximum available number of users, the time information receiving unit 601 can receive information regarding executable time only using data stored in the buffer 651, i.e., data-not-reception executable time information, without receiving additional data from the terminal 650 that is currently providing a service. The channel bandwidth calculating unit 602 determines whether a channel bandwidth can be allocated to a user that additionally requests a service and then calculates the maximally securable channel bandwidth.

The channel bandwidth allocating unit 603 compares the maximally securable channel bandwidth with a request channel bandwidth for providing an additionally requested VoD service during the unit time. If the maximally securable channel bandwidth is greater than a request channel bandwidth, the channel bandwidth allocating unit 603 concludes that the channel bandwidth allocating unit 603 can provide a service. The channel bandwidth allocating unit 603 controls the transmission speed by reducing the channel bandwidths that are provided to terminals that were receiving a VoD service. The reduction of the channel bandwidth of users that were receiving the service is performed by sorting the amount of stored data by the priority sequence, and then reducing the channel bandwidth from the user that has the largest amount of data. The channel bandwidth allocating unit 603 allocates a request channel bandwidth for providing an additionally requested VoD service to a terminal that additionally requests a VoD service.

The storing unit 604 stores the content provided through the VoD service. The data transmitting unit 605 transmits the content stored in the storing unit 604 to the terminals under the control of the channel bandwidth allocating unit 601.

The terminal 605 includes a buffer 652, a playback unit 652, and an execution time measuring unit 653. The terminal 605 receives the maximum amount of data via the maximum bandwidth and stores the received data in the buffer 651. The playback unit 652 loads and executes data from the buffer 651. The execution-time measuring unit 653 measures an executable time using only data stored in the buffer 651 without receiving additional data, according to the request of the sever 600, and reports the executable time to the server 600. The executable time is also referred to as a data-not-reception executable time.

As described above, the method and apparatus according to embodiments of the present invention can efficiently allocate channel bandwidths for the VoD service in a wireless IPTV system and thus increase the number of users who can use the service. The method and apparatus according to embodiments of the present invention can additionally allocate channel bandwidths for additional users while all channels are being used, by the use of a dynamic bandwidth allocation technology, guaranteeing the QoS of existing users, thereby efficiently using the limited network resources.

Although certain embodiments of the present invention have been described in detail hereinabove, it should be understood that many variations and modifications of the basic inventive concept herein described, which may be apparent to those skilled in the art, will still fall within the spirit and scope of the embodiments of the present invention as defined in the appended claims.

What is claimed is:

1. A method for allocating channel bandwidths in a wireless Internet Protocol TeleVision (IPTV) system, the method comprising:
   receiving an additional service offering request from a user in a channel saturation state that exceeds a number of users who can use the service;
   measuring remaining execution times until a service of each terminal that is currently receiving the service is terminated;
   setting a minimum of the measured remaining execution times to a unit time;
   calculating a securable channel bandwidth per the unit time with respect to each terminal that is currently receiving the service;
   summing the securable channel bandwidths per the unit time for all terminals that are currently receiving the service; and
   allocating the requested channel bandwidth in order to provide the additional service, if a summation of the securable channel bandwidths per the unit time is at least equal to the channel bandwidth required to provide the additional service.

2. The method of claim 1, wherein allocating the requested channel bandwidth further comprises:
   reducing and re-allocating each channel bandwidth allocated to the terminals that are currently receiving the service.

3. The method of claim 1, wherein the service includes a Video on Demand (VoD) service.

4. The method of claim 1, further comprising:
   receiving information regarding an executable time using data stored in buffers of terminals from the terminals that are currently receiving a service, wherein the received information is information regarding a data-not-reception executable time.

5. The method of claim 4, wherein the securable channel bandwidth per the unit time with respect to a terminal B from among the terminals that are currently receiving a service is acquired from:

$$\text{Securable channel bandwidth} = \text{transmission speed to user terminal } B \times \text{unit time},$$

wherein the data-not-reception executable time of one of the terminals is greater than or equal to the unit time.

6. The method of claim 4, wherein the securable channel bandwidth per the unit time with respect to a terminal B from among the terminals that are currently receiving a service is acquired from:

$$\text{Securable channel bandwidth} = (\text{transmission speed to terminal } B \times \text{data-not-reception executable time}) + (\text{transmission speed to terminal } B - \text{lowest transmission speed to user terminal } B) \times (\text{unit time} - \text{data-not-reception executable time}),$$

wherein the data-not-reception executable time of one of the terminals is smaller than the unit time.

7. An apparatus for providing a wireless Internet Protocol TeleVision (IPTV) service, comprising:
- a channel bandwidth calculating unit for measuring, if an additional service offering request is received from a user, by the apparatus in a saturation channel state that exceeds a number of users who can use the service, remaining execution times until the service of each terminal that is currently receiving the service is terminated, for setting a minimum of the measured remaining execution times to a unit time, and for calculating a securable channel bandwidth per the unit time with respect to each terminal that is currently receiving the service;
- a device for summing the securable channel bandwidth per the unit time for all terminals that are currently receiving the service; and
- a channel bandwidth allocating unit for allocating, if the summation of the securable channel bandwidths per the unit time is at least greater than a channel bandwidth required to provide the additional service, the requested channel bandwidth in order to provide the additional service.

8. The apparatus of claim 7, wherein the channel bandwidth allocating unit reduces and re-allocates each channel bandwidth allocated to the terminals that are currently receiving the service.

9. The apparatus of claim 7, wherein the service includes a Video on Demand (VoD) service.

10. The apparatus of claim 7, further comprising:
- a time information receiving unit for receiving information regarding an executable time using data stored in buffers of terminals from the terminals that are currently receiving a service, wherein the received information is information regarding a data-not-reception executable time.

11. The apparatus of claim 10, wherein the securable channel bandwidth per the unit time with respect to a terminal B from among the terminals that are currently receiving a service is acquired from:

$$\text{Securable channel bandwidth} = \text{transmission speed to terminal } B \times \text{unit time,}$$

wherein the data-not-reception executable time of one of the terminals is greater than or equal to the unit time.

12. The apparatus of claim 10, wherein the securable channel bandwidth per the unit time with respect to a terminal from among the terminals that are currently receiving a service is acquired from:

$$\text{Securable channel bandwidth} = (\text{transmission speed to terminal } B \times \text{data-not-reception executable time}) + (\text{transmission speed to terminal } B - \text{lowest transmission speed to user terminal } B) \times (\text{unit time} - \text{data-not-reception executable time}),$$

wherein the data-not-reception executable time of one of the terminals is smaller than the unit time.

* * * * *